Figure 1:
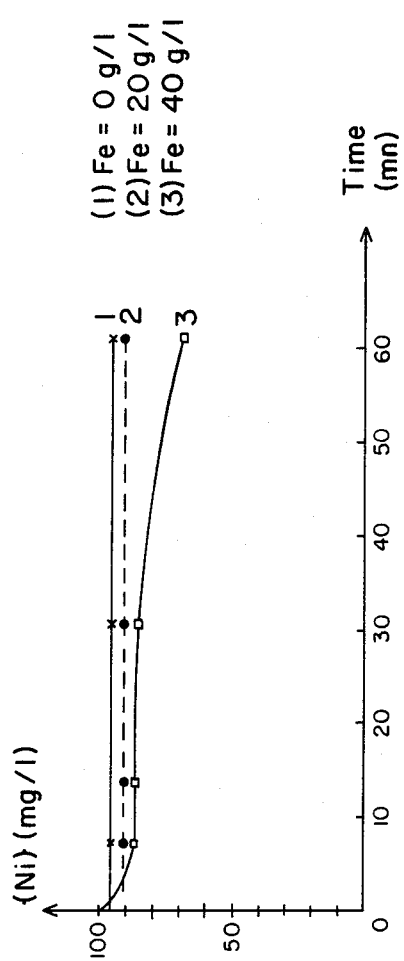

United States Patent [19]

Beutier et al.

[11] Patent Number: 4,548,793

[45] Date of Patent: Oct. 22, 1985

[54] ELECTROCHEMICAL ELIMINATION OF NICKEL FROM LEAD CONTAINING CHLORIDE SOLUTIONS

[75] Inventors: Didier Beutier; Hugues Bruvier, both of Paris; Claude Palvadeau, Breuillet, all of France

[73] Assignee: Societe Miniere et Metallurgique de Penarroya, Paris, France

[21] Appl. No.: 458,148

[22] Filed: Jan. 14, 1983

[51] Int. Cl.$^4$ .............................................. C22B 3/00
[52] U.S. Cl. ...................................... 423/92; 75/109; 423/87; 423/140
[58] Field of Search ............... 423/92, 98, 87, 140; 75/109

[56] References Cited

U.S. PATENT DOCUMENTS

| | | |
|---|---|---|
| 3,117,000 | 1/1964 | Schlain et al. ............. 75/109 |
| 3,333,953 | 8/1967 | Zimmerley et al. ........ 75/109 |
| 3,473,920 | 10/1969 | Fitzhugh et al. .......... 75/109 |
| 3,560,201 | 2/1971 | Lefler et al. .............. 75/109 |
| 3,637,372 | 1/1972 | Mayor et al. ............. 75/109 |
| 3,737,307 | 6/1973 | Fitzhugh et al. .......... 75/109 |
| 3,874,940 | 4/1975 | Vera et al. ............... 75/109 |
| 3,940,470 | 2/1976 | Kane et al. .............. 75/109 |
| 3,985,554 | 10/1976 | McCoy ................... 75/109 |
| 4,309,215 | 1/1982 | Nissen et al. ............. 75/109 |

FOREIGN PATENT DOCUMENTS

| | | | |
|---|---|---|---|
| 2033586 | 1/1971 | Fed. Rep. of Germany | 75/109 |
| 2057327 | 5/1971 | France | 75/109 |
| 138950 | 2/1920 | United Kingdom | 75/109 |

*Primary Examiner*—John Doll
*Assistant Examiner*—Wayne A. Langel
*Attorney, Agent, or Firm*—Fleit, Jacobson, Cohn & Price

[57] ABSTRACT

The invention relates to a process for removing nickel from lead chloride dissolved into chloride brine to obtain lead chloride solution wherein the nickel concentration is under 50 mg/liter. The present invention comprises the following steps:

(a) adjusting the content of an element selected from the group of arsenic and antimony to a value of at least 1/5 of the concentration in nickel expressed in grams per liter;

(b) contacting the solution from (a) with lead powder thus precipitating nickel and the said element selected from the group of arsenic and antimony.

3 Claims, 3 Drawing Figures

ELECTROCHEMICAL ELIMINATION OF NICKEL FROM LEAD CONTAINING CHLORIDE SOLUTIONS

The object of the present invention is to provide a method for the purification of lead chloride dissolved in chloride brine.

More specifically, the object of the invention is to provide a process for removing nickel from lead chloride solution.

One of the most difficult problems to be solved in the hydrometallurgy of lead is to remove the nickel from lead chloride solution. The problem is more difficult if ferrous chloride is present in solution because of the very similar behaviour of nickel and iron at the valence II. More precisely, it is very difficult to find cation exchange resins which are able to extract nickel if, at one and the same time, ferrous chloride is present and a very low level of nickel, i.e. 50 mg/l in nickel and more preferably 10 mg/l are required.

This is why one of the aims of the present invention is to find a process able to reduce the nickel concentration of a lead chloride solution below 50 mg/l, advantageously 10 mg/l and more preferably 1 mg/l.

This aim is attained by a process for removing nickel from lead chloride dissolved in chloride brine to obtain lead chloride solution wherein the nickel concentration is under 50 mg/liter which comprises:
(a) adjusting the content of an element selected from the group consisting of arsenic and antimony to a value of at least 1/5 of the concentration in nickel expressed in grams per liter;
(b) contacting the solution from (a) with lead powder thus precipitating nickel and the said element selected from the group consisting of arsenic and antimony.

The lead concentration of lead chloride solution may be in the range of 1 g/l to the limit of the solubility of lead chloride depending on the concentration and the nature of the chloride brine.

The brine may be made of solution of alkaline and alkaline-earth metals. Ammonium chloride may also be used depending on the possible further steps. For example, if lead chloride is recovered by evaporation or in the form of an oxide, ammonium chloride may be used whereas if lead chloride is submitted to an electrolysis, the anodic reaction may oxidize the ammonium cation.

The solution may also contain all usual elements that are dissolved by the leaching of lead primary or secondary materials: zinc, iron, copper, cadmium, cobalt, precious metals, bismuth for example.

Such a chloride solution, produced by the leaching, will have a pH value not higher than 4 and a preferably high temperature, however not higher than the boiling point under atmospheric pressure.

One of the aims of the present invention is to render such a solution pure enough to be submitted to electrolysis, and by that way to produce pure soft lead. Cementation with lead, when applied according to the present invention, will be a most significant step in the purification of lead, since it will precipitate not only copper, bismuth and precious metals, as it is known from previous state of the art, but also nickel.

The present invention is based upon the following discoveries:
(a) Surprisingly enough, partial cementation of nickel by lead is possible in concentrated chloride solution when ferrous ion is present, although lead is known to be oxidized at higher potential values than nickel
(b) When an activator, such as arsenic or antimony, is present or added into the solution, the cementation of nickel can be total.
(c) The presence of copper strongly enhances the process of cementation by lead powder.

Under proper conditions, the kinetics of cementation can be fairly high: for example, nickel concentration is lowered from 10 mg/l to less than 0.5 mg/l in one hour, when the cementation is achieved in a stirred tank, at a temperature of 90° C., with 5 g/l of fine lead powder, in the presence of 50 mg/l of copper and 30 mg/l of antimony. It has been observed that the kinetics of cementation in a stirred reactor are mainly dependent on the following parameters: temperature, initial quantities of copper and arsenic (or antimony), initial quantity and granulometry of lead powder.

Examples shown hereafter all refer to the cementation by lead powder in a stirred tank, but it must not be considered as a limitation in the application of the present invention: for instance, the technique of electrolysis may also be applied, especially if cathodes of high specific area are used.

The influence of the main parameters will now be described with more details in the following examples. All the results are obtained in the following way:
(a) The solution to be purified, containing sodium chloride and lead chloride mainly, is introduced into a glass reactor of two liters, that is equipped with an agitator. Then it is heated up to the temperature of 90° C.
(b) The activator is introduced as oxide: $As_2O_3$ or $Sb_2O_3$.
(c) Lead powder is added, in quantities of 1 to 10 g/l; it has a very fine granulometry ($d_{80}=80$ microns).
(d) The cementation takes place during one hour; to observe its progression, samples of solution are taken in regular intervals and analyzed for nickel by atomic absorption spectrometry.

Figure 2:
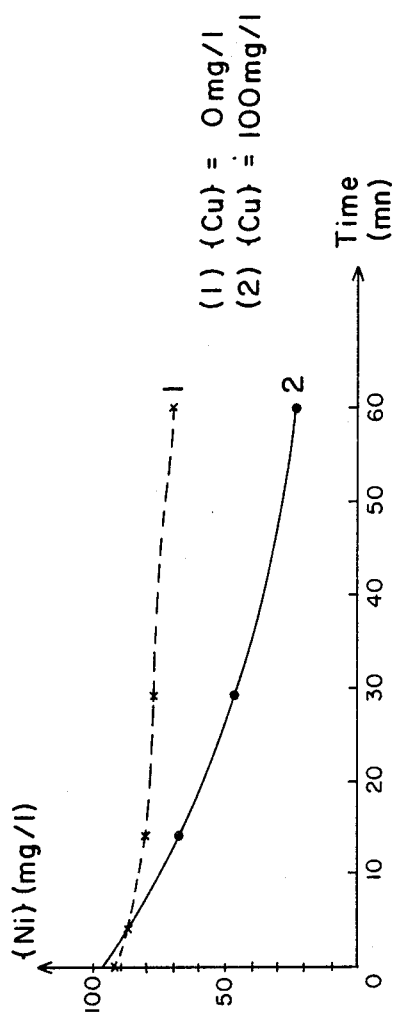
Figure 3:
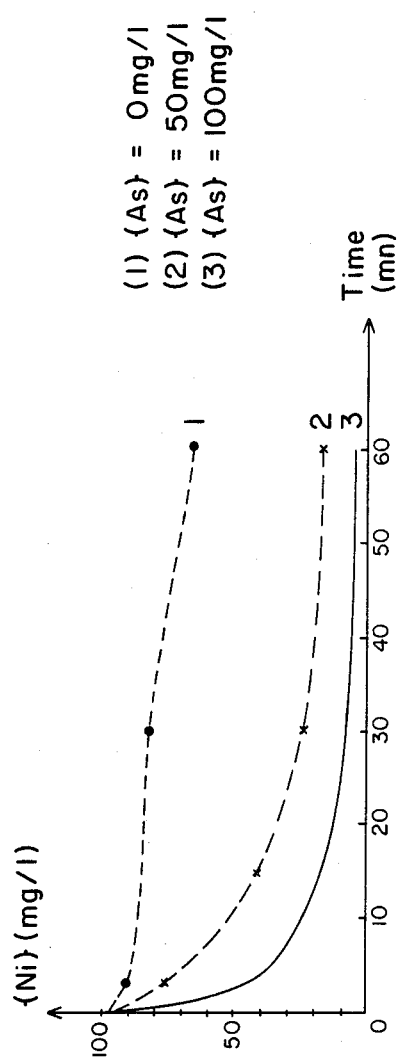

In referring to the examples,

FIGS. 1, 2 and 3 are graphs showing experimental data related to the invention.

EXAMPLE 1

Influence of the Iron

The solution to be purified is brought to 90°C., its composition is the following:

| | | | |
|---|---|---|---|
| {Cl$^-$} | = | 5.5 N | {H$^+$} = $10^{-2}$ N |
| {Pb} | = | 40 g/l | |
| {Cu} | ≃ | 100 mg/l | |
| {Ni} | ≃ | 100 mg/l | |
| {Fe} | | variable | |

The introduction of the lead powder causes cementation of copper and nickel as it is shown by the following results:

| Initial Fe | 0 g/l | 20 g/l | 40 g/l |
|---|---|---|---|
| Residual Ni | 95 mg/l | 92 mg/l | 67.5 mg/l |

The presence of ferrous ions promotes the cementation of nickel, the reduction of nickel by the contact of lead powder is increased by 68.9%.

EXAMPLE 2

Influence of the Copper

The reaction conditions are the same as for example 1, the variable is this time the copper concentration.

Solution before cementation

| {Cl$^-$} | = | 5.5 N | H$^+$ = 10$^{-2}$ N |
| --- | --- | --- | --- |
| {Pb} | = | 40 g/l | |
| {Ni} | ≃ | 100 mg/l | |
| {As} | ≃ | 100 mg/l | |
| {Cu} | | variable | |

After addition of the lead powder the following results are obtained:

| Initial Cu | 0 g/l | 100 mg/l |
| --- | --- | --- |
| Residual Ni | 70 mg/l | 28 mg/l |

The presence of copper in the solution is necessary for the cementation of nickel, it hinders the agglomeration of the lead powder which reduces otherwise the interfacial active surface.

EXAMPLE 3

Influence of the Arsenic

To show the influence of the arsenic, the initial solution has the following composition:

| {Cl$^-$} | = | 5.5 N | H$^+$ = 10$^{-2}$ N |
| --- | --- | --- | --- |
| {Pb} | = | 40 g/l | |
| {Fe} | = | 40 g/l | |
| {Cu} | ≃ | 100 mg/l | |
| {Ni} | ≃ | 100 mg/l | |
| {As} | | variable | |

| Initial As | 0 g/l | 50 mg/l | 100 mg/l |
| --- | --- | --- | --- |
| Residual Ni | 67.5 mg/l | 21.5 mg/l | 2.2 mg/l |

The curves above show clearly the effect of an increase of arsenic content on the cementation of nickel.

It has to be noted that together with the nickel, the copper is cemented too.

EXAMPLE 4

Influence of the Antimony

As comparison with the arsenic, we have also tested the effect of the antimony.

Composition of the initial solution

| {Cl$^-$} | = | 5.5 N | H$^+$ = 10$^{-2}$ N |
| --- | --- | --- | --- |
| {Pb} | = | 40 g/l | |
| {Fe} | = | 40 g/l | |
| {Cu} | ≃ | 50 mg/l | |
| {Ni} | ≃ | 10 mg/l | |
| {Sb} | | variable | |

The lead powder causes the cementation of copper and nickel.

| Initial Sb | 30 mg/l |
| --- | --- |
| Initial Ni | 9.8 mg/l |
| Residual Ni | <0.5 mg/l |

The effect of the antimony is as remarkable as the one with arsenic.

EXAMPLE 5

Influence of the Concentration of Lead Powder

The presence of the appropriate amounts of arsenic, copper and nickel does not necessarily ensure a good cementation. The concentration of lead powder is also an important factor.

The experimental conditions are the following:

Composition of the initial solution

| {Cl$^-$} | = | 5.5 N | H$^+$ = 10$^{-2}$ N |
| --- | --- | --- | --- |
| {Pb} | = | 40 g/l | |
| {Fe} | = | 40 g/l | |
| {Ni} | ≃ | 10 mg/l | |
| {Cu} | ≃ | 50 mg/l | |
| {As} | | 30 mg/l | |
| Lead powder | | variable | |

The following results were obtained:

| Initial Pb | 2 g/l | 5 g/l |
| --- | --- | --- |
| Initial Ni | 9.8 mg/l | 9.6 mg/l |
| Residual Ni | 3.1 mg/l | <0.5 mg/l |

The concentration of lead powder is a key-factor of the cementation, the residual concentrations of nickel obtained after cementation are extremely low.

In view of these low residual concentrations obtained after cementation (<0.5 mg/l), this process of purification can easily be integrated into a process of lead production by electrolysis of a solution. Actually, the only impurities which remain susceptible to be co-deposited with the lead are the residual iron and arsenic. It is known that lead ingots completely free of those impurities can be obtained by fusion of lead metal under a blanket of soda.

What we claim is:

1. A process for removing nickel from lead chloride dissolved in a chloride brine to obtain a lead chloride solution wherein the nickel concentration is under 50 mg/liter which comprises:
    (a) adjusting the content of an element selected from the group consisting of arsenic and antimony to a value of at least 1/5 of the concentration of nickel expressed in grams per liter;
    (b) adjusting the concentration of copper to a value of at least 1/5 of the concentration of nickel expressed in grams per liter; and
    (c) contacting the solution from (b) with lead powder thus precipitating nickel and the said element selected from the group consisting of arsenic and antimony.

2. Process of claim 1 wherein in step (a) the content of the element selected from the group consisting of arsenic and antimony is adjusted to a value between 4 and 10 times the concentration of nickel expressed in grams per liter.

3. Process of claim 1 wherein said concentration of copper is adjusted to a value between 4 and 10 times the concentration of nickel expressed in grams per liter.

* * * * *